United States Patent
Welle et al.

(10) Patent No.: US 8,655,605 B2
(45) Date of Patent: Feb. 18, 2014

(54) MOBILITY DETECTION IN FILL-LEVEL MEASURING DEVICES

(75) Inventors: Roland Welle, Oberwolfach (DE); Karl Griessbaum, Muehlenbach (DE)

(73) Assignee: VEGA Grieshaber KG, Wolfach (DE)

( * ) Notice: Subject to any disclaimer, the term of this patent is extended or adjusted under 35 U.S.C. 154(b) by 203 days.

(21) Appl. No.: 13/019,726

(22) Filed: Feb. 2, 2011

(65) Prior Publication Data

US 2012/0035867 A1 Feb. 9, 2012

Related U.S. Application Data

(60) Provisional application No. 61/314,850, filed on Mar. 17, 2010.

(30) Foreign Application Priority Data

Mar. 17, 2010 (EP) .................................. 10156793

(51) Int. Cl.
*G01F 23/00* (2006.01)
*G01F 23/284* (2006.01)
*G01F 23/296* (2006.01)

(52) U.S. Cl.
CPC .......... *G01F 23/284* (2013.01); *G01F 23/2962* (2013.01)
USPC ........................................................... 702/55

(58) Field of Classification Search
CPC .......................... G01F 23/284; G01F 23/2962

USPC ........................................................... 702/55
See application file for complete search history.

(56) References Cited

U.S. PATENT DOCUMENTS

| | | | | |
|---|---|---|---|---|
| 5,157,639 | A * | 10/1992 | Leszczynski | 367/99 |
| 7,284,425 | B2 | 10/2007 | Wennerberg et al. | |
| 2005/0052314 | A1 * | 3/2005 | Spanke et al. | 342/124 |
| 2006/0052954 | A1 | 3/2006 | Welle et al. | |
| 2006/0137446 | A1 * | 6/2006 | Wennerberg et al. | 73/290 V |
| 2008/0154522 | A1 * | 6/2008 | Welle et al. | 702/55 |
| 2010/0305885 | A1 * | 12/2010 | Ganapathy et al. | 702/55 |

FOREIGN PATENT DOCUMENTS

| | | |
|---|---|---|
| DE | 3337690 | 4/1985 |
| DE | 4234300 | 4/1994 |
| EP | 1628119 | 2/2006 |
| EP | 2148219 | 1/2010 |
| WO | 2009/003700 | 1/2009 |

* cited by examiner

*Primary Examiner* — John E Breene
*Assistant Examiner* — Timothy H Hwang
(74) *Attorney, Agent, or Firm* — Fay Kaplun & Marcin, LLP (57) ABSTRACT

Detecting the mobility of a fill level echo according to the following steps. The echo characteristic of a first echo of the echo curve and an echo characteristic of a second echo of the echo curve are determined. This is followed by calculation of a mobility value of the second echo with the use of the first echo characteristic. In this way a situation can be achieved in which the differences in the mobility values of echoes relating to the fill level and those echoes that are due to container internals become greater.

11 Claims, 12 Drawing Sheets

| ID | Echo start/m | Echo position/m | Echo end/m | Amplitude/dB |
|---|---|---|---|---|
| E0 | 1.60 | 2.00 | 2.40 | 40 |
| E1 | 2.60 | 3.00 | 3.40 | 36 |
| E2 | 3.60 | 4.00 | 4.40 | 38 |

| $t = t_3$ |

| ID | Point in time | Echo position/m |
|---|---|---|
| $T_0$ | $t_1$ | 2.00 |
|  | $t_2$ | 2.00 |
|  | $t_3$ | 2.00 |
| $T_1$ | $t_2$ | 3.00 |
|  | $t_3$ | 3.00 |
| $T_2$ | $t_0$ | 1.00 |
|  | $t_1$ | 2.50 |
|  | $t_2$ | 3.50 |
|  | $t_3$ | 4.00 |

MOBILITY DETECTION IN FILL-LEVEL MEASURING DEVICES

REFERENCE TO RELATED APPLICATIONS

This application claims the benefit of the filing date of EP Patent Application Serial No. 10 156 793.1 filed Mar. 17, 2010 and U.S. Provisional Patent Application Ser. No. 61/314,850 filed Mar. 17, 2010, the disclosure of which applications is hereby incorporated herein by reference.

TECHNICAL FIELD

The present invention relates to fill level measuring. In particular, the invention relates to a fill-level measuring device for detecting the mobility of an echo, to a method for detecting the mobility of an echo, to a program element and to a computer-readable medium.

BACKGROUND INFORMATION

In fill level sensors operating according to the FMCW or pulse transit-time method, electromagnetic or acoustic waves are emitted in the direction of a feed material surface. Subsequently the sensor records the echo signals reflected by the feed material and by the container internals and from these derives the respective fill level. Other fill level sensors operate according to the principle of guided microwaves.

A method used according to the current state of the art is essentially based on spurious echo storage that is carried out by a user when the container is empty.

DE 33 37 690 A1, DE 42 34 300 A1, EP 16 281 19 A1, U.S. Pat. No. 7,284,425 B2, WO 2009/003700 A1, EP 21 482 19 A1 describe known methods.

The methods described therein may inadequately fulfil the task of reliably identifying the fill level echo when spurious echoes are present.

The user of a fill-level measuring device cannot always be expected, within the context of commissioning the sensor, to carry out spurious echo storage when the container is empty. In particular in the case of procurement as a replacement part in ongoing operation, it happens time and again that the container to be measured is completely full of material. Nevertheless, a newly installed fill level sensor is to ensure reliable measuring.

The method for identifying the fill level echo based on continuous time shift in successive receiving phases has up to now been reaching its limits in practical applications. The implementation of a robust algorithm to detect time shifts of individual echoes is a requirement for reliable application of the method. Known methods to detect movements by means of tracking to be carried out in advance also do not obviate the need for a robust method. Thus, in the context of a tracking method it can happen time and again that echoes are incorrectly allocated to existing tracks, which will result in incorrect determination of the movement information.

SUMMARY OF THE INVENTION

The present invention relates to a method for detecting changes over time in characteristic values of one or several echoes within a fill-level measuring device.

Stated are a fill-level measuring device for detecting the mobility of an echo, a method for detecting the mobility of an echo, a program element and a computer-readable medium. The characteristics mentioned below for example with a view to the method may also be implemented in the fill-level measuring device and are thus at the same time characteristics of the fill-level measuring device. Likewise, the characteristics of the fill-level measuring device, which characteristics are mentioned hereinafter, may also be implemented as method-related steps.

According to a first aspect of the invention, a fill-level measuring device for detecting the mobility of an echo is stated, which fill-level measuring device comprises a process (also called an arithmetic unit) for determining a first echo characteristic of a first echo of an echo curve, and for determining a second echo characteristic of a second echo of the echo curve. The processor (arithmetic unit) is designed for calculating a mobility value of the second echo of the echo curve with the use of the first echo characteristic (and if applicable also with the use of the second echo characteristic).

In this arrangement the term echo curve refers to a measurement curve which plots, for example, the distance covered by the transmit/receive signal against the amplitude of the aforesaid. This echo curve can comprise several peaks that result from the container geometry or that correspond to the fill level. Hereinafter these peaks are referred to as echoes.

The term "echo characteristic" refers, for example, to the position of the echo (in other words the space between the fill-level measuring device and the echo source). Furthermore, the echo characteristics may relate to the width of the echo, the signal-to-noise ratio of the echo, the echo start, the echo end, the area underneath the echo, etc.

The term "mobility value" of an echo refers, for example, to a characteristic of an echo, which characteristic is determined taking into account at least one characteristic of a further echo. For example, according to the present invention the term "mobility" may refer to a characteristic relating to the echo movement, which characteristic is determined taking into account simultaneously occurring movements of at least one further echo (or of some other change in the further echo).

The different echoes may be classified after each reading so that their development over time can be tracked. In this process it is provided for mobility values of the echoes to be calculated, wherein the arithmetic unit carries out the mobility value of a second echo of the echo curve with the use of the first echo characteristic (of the first echo).

In this way a situation may be achieved in which echoes that have not changed or have barely changed, when compared to the previous reading, are allocated a new mobility value that is calculated taking into account a changing echo. In this way it may be possible to "punish" echoes that have not moved, by reducing their mobility value.

If none of the echoes have changed their characteristics, it may be provided for none of the mobility values to be changed.

According to a further aspect of the invention, a method for detecting the mobility of an echo is stated in which a first echo characteristic of a first echo of an echo curve is determined. Furthermore, a second echo characteristic of a second echo of the echo curve is determined. This is followed by the calculation of a mobility value of the second echo of the echo curve with the use of the first echo characteristic.

According to a further aspect of the invention, a program element (computer program) is stated which when executed on a processor of a fill-level measuring device instructs the processor to carry out the steps described above and below.

According to a further aspect of the invention, a computer-readable medium is stated on which a program element is stored which when executed on a processor of a fill-level measuring device instructs the processor to carry out the steps described above and below.

According to an exemplary embodiment of the invention, the first echo characteristic is a first position shift of the first echo in the echo curve during a defined time interval. The second echo characteristic is a second position shift of the second echo of the echo curve during the same time interval.

According to a further exemplary embodiment of the invention, the echo curve is measured at a first point in time, wherein for calculation of the mobility value of the second echo of the echo curve only the first echo characteristic of the first echo is used if the second echo characteristic is zero or if the second echo characteristic agrees with the corresponding echo characteristic of the preceding reading.

According to a further exemplary embodiment of the invention, for calculating the mobility value of the second echo of the echo curve only the first echo characteristic of the first echo is used if the second echo characteristic indicates that the second echo has not shifted since an echo curve measured prior to the first point in time.

Thus if the second echo characteristic is zero or constant, the mobility value of the second echo is nevertheless calculated anew, however in that exclusively characteristics of other echoes are used.

According to a further exemplary embodiment of the invention, the use of the first echo characteristic for calculating the mobility value of the second echo of the echo curve results in a decrease of the mobility value if the second echo has not moved since a preceding reading, if the second echo characteristic is zero or if the second echo characteristic has not changed since the preceding reading.

According to a further exemplary embodiment of the invention, the mobility value of the second echo of the echo curve is calculated in that the first echo characteristic is subtracted from a mobility characteristic of the second echo. This mobility characteristic can, for example, be the previously calculated mobility value of the second echo of the echo curve.

According to a further exemplary embodiment of the invention, the arithmetic unit is designed for calculating a mobility value of the first echo of the echo curve with the use of the second echo characteristic (and if need be also the first echo characteristic).

It may thus be possible to calculate the mobility values of the individual echoes with the use of characteristics of other echoes.

According to a further exemplary embodiment of the invention, the fill-level measuring device is a fill level radar.

Thus, echo functions (echo curves) are received, wherein the echo functions comprise at least two echoes of an echo reading. Furthermore, at least one characteristic is determined for each of the at least two echoes. This is followed by the determination of a mobility value of at least one echo of the echo curve, wherein in this process at least one characteristic of this echo and at least one characteristic of a further echo can be used.

The illustrations in the figures are diagrammatic and not to scale.

In the following description of the figures the same reference characters are used for identical or similar elements.

DETAILED DESCRIPTION OF EXEMPLARY EMBODIMENTS

The present invention relates to a method for measuring fill levels of whatever type.

Figure 1:
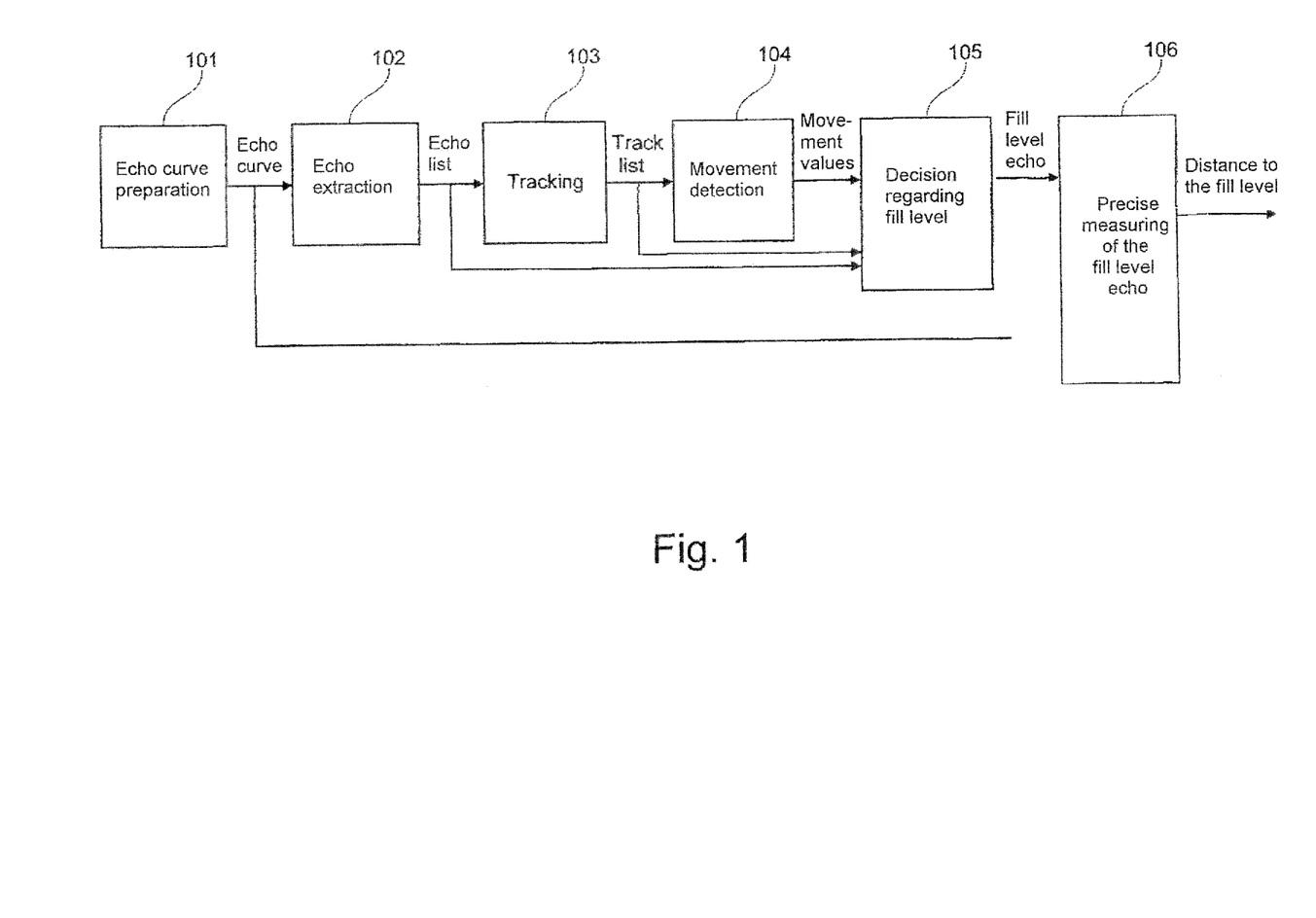
FIG. 1 shows a flow chart of an echo-signal processing procedure.

FIG. 1 shows the basic sequence of echo signal processing within a commercial fill-level measuring device.

The block "Echo curve preparation" 101 comprises all the hardware and software units that are required to provide an echo curve as an image of the then reflection relationships within a container. The echo curve is preferably acquired in digital form within a micro processor system, and by means of known methods is examined for echoes contained therein.

The methods applied for this purpose within the block "Echo extraction" 102 comprise, in particular, methods from the field of threshold-value-based echo extraction or methods on the basis of scale-based echo extraction. After execution of the echo extraction method a digital echo list is provided which preferably comprises details relating to the start, place and end of one or several echoes contained in the echo curve.

In order to further increase the reliability of echo signal processing of a fill-level measuring device, the found echoes are placed in a historic context within the block "Tracking" 103. The methods used in this process arise from the current state of the art. Thus, for example, methods based on the Munkres algorithm can advantageously be used. Within the tracking, in particular the gradient of the location of an echo across several individual readings is tracked, and this collected information is represented in the memory in the form of a track. The collected history information of several echoes is provided extraneously in the form of a track list.

Building on the delivered track list, in the block "Movement detection" 104 an analysis of the track list for continuous changes of an echo characteristic, for example the echo location, is carried out. The results of this analysis are provided extraneously in the form of movement values.

In the block "Decision regarding fill level" 105 the data of the echo list current at the time, the information relating to the progression over time of individual echoes, and the results of movement detection are balanced. In this process, of particular significance is the evaluation of the progression over time of the location based on the history information of the echoes, which information is acquired in the form of tracks.

In order to further improve the accuracy of fill level measuring, the position of the determined fill level echo can be determined with high accuracy by means of the optional block "Precise measuring of the fill level echo" 106 with the use of computing-time-intensive methods, for example interpolation methods.

The determined distance to the fill level is provided to the outside. The provision may be implemented in analogue form (4.20 mA interface) or in digital form (fieldbus).

Figure 2:
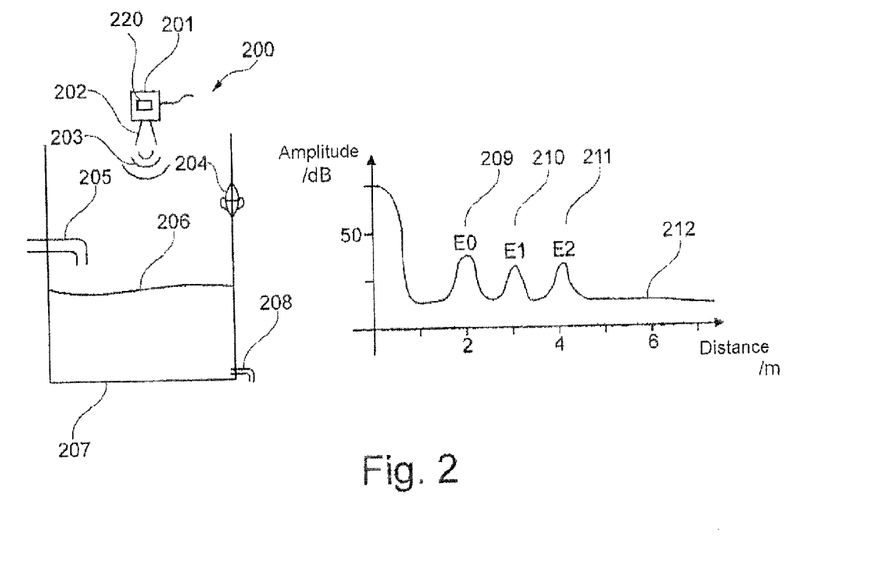
FIG. 2 shows a fill-level measuring device according to an exemplary embodiment of the invention.

Below, some options are mentioned as to how the echo (useful echo) generated by the fill level may be identified:

Within spurious echo storage that is to be initiated manually by the user, spurious reflections 209, 210 of container internals can be acquired by the sensor and for further processing can be stored in a suitable form in a memory region.

For example, among a present number of echoes of an echo curve precisely that echo can be evaluated as a useful echo, which echo in subsequent receiving phases shows a continuous time shift. If several echoes in subsequent receiving phases show a time shift, then among the moving echo the echo with the shortest distance to the sensor is identified as being the useful echo.

Furthermore, a system for tracking can be implemented, in which system echoes are combined to form global echo groups, and in which system characteristics of the track are calculated from the local shift of the echoes that form part of the respective track.

Likewise it may be possible to acquire the distance to the feed material surface in subsequent measuring cycles, and by means of differentiation to calculate a characteristic relating to the propagation characteristics.

For example, the movement speed of a track can be estimated on the basis of Kalman filtering.

The advantages of the present invention result from the special boundary conditions to which echo signal processing within a fill-level measuring device is subjected.

FIG. 2 shows an exemplary embodiment of such a device.

By way of the antenna 202 the fill-level measuring device 201 emits a signal 203 in the direction of the medium 206 to be measured. The fill-level measuring device itself can determine the distance to the medium according to the principles of ultrasound, radar, laser or guided microwaves. Correspondingly, either ultrasonic waves or electromagnetic waves can be considered as signals. The medium 206 reflects the impacting wave back to the measuring device where it is received and processed. At the same time the emitted signal is also reflected by container internals, for example a container access device 204 or an inlet pipe 205. The echo curve 212 received in the fill-level measuring device 201 can thus receive not only the useful echo 211 caused by the fill level 206, but also echoes of firmly installed interference positions 209, 210, hereinafter referred to as "spurious echoes". Apart from an inlet pipe 205, the feed material container 207 also comprises an outlet pipe 208, whose reflections can be neglected in the present case.

Figure 3:
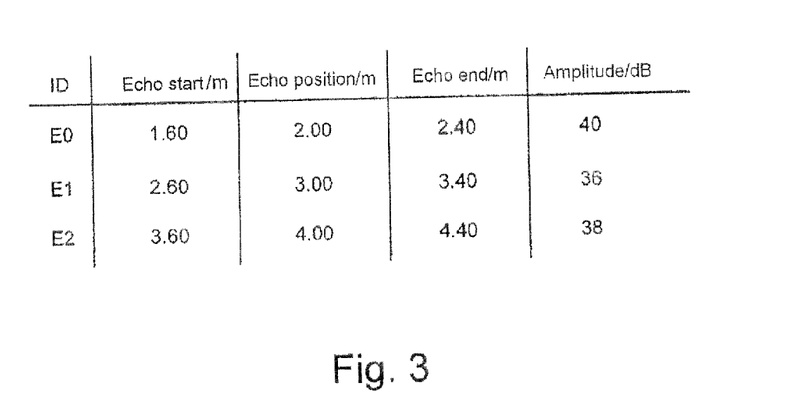
FIG. 3 shows an echo list.

Within the signal processing operation then carried out by the arithmetic unit 220 the echo curve is examined in a targeted manner for echoes 102. As a result of echo extraction an echo list according to the diagram of FIG. 3 is generated. Apart from the characteristics of the spurious echo E0, 209 generated by the container access device 204, the echo list can include a further spurious echo E1, 210 generated by the inlet pipe 205, as well as the fill level echo E2, 211 generated by the medium 206.

The characteristics shown of the echo list of course only represent a special implementation of an echo list. In practical applications echo lists with further characteristics or with changed characteristics of an echo are also common.

At this stage it should be pointed out that processing the echo curve 212 with the aim of identifying the echo generated by the fill level presents a special challenge because three echoes of almost identical amplitude are to be found.

Below, method-related steps that are also used within the context of the present invention are described in more detail with reference to the figures.

Figure 4:
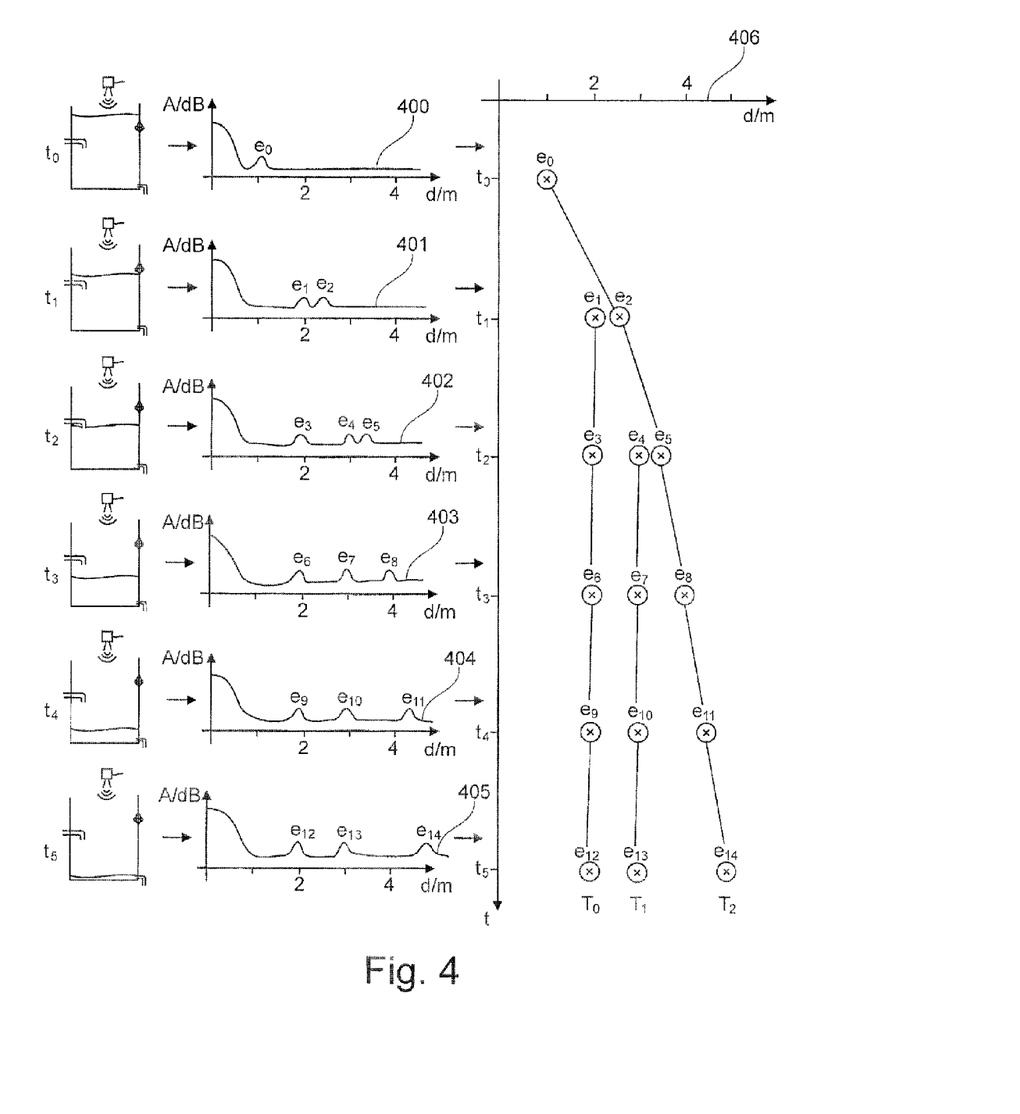
FIG. 4 shows the repetition of measuring cycles during emptying of a container.

If in a fill-level measuring device cyclical measuring cycles are implemented, this results in a sequence of received echo curves as shown in FIG. 4. As an example, six independent measuring cycles at a time interval in each case of five minutes are shown. Of course significantly faster measuring cycles, for example with a time interval of 1 second, can also be implemented.

The scenario presented shows the conditions when a container 207 is emptied. At each of the points in time t0, t1, t2, t3, t4 and t5 a measuring cycle of the fill-level measuring device 201 is initiated. After the respective echo curve 400, 401, 402, 403, 404, 405 has been received, it is examined for echoes by means of known methods.

In order to be able to track the individual echoes across several such measuring cycles, based on the echo list generated, in the further course of the method specialised algorithms can be used, which in the literature are described in detail under the term "tracking". Of course, it may also be possible to determine the course of a characteristic (e.g. location) of one or several echoes in some other manner.

In the present example the course of the echoes e1, e3, e6, e9 and e12 that are caused by the container access device 204 is described by a shared track T0. In addition, the course of the echoes e4, e7, e10, e13 that are caused by the inlet pipe 205 are described by the associated track T1. The course of the echoes caused by the feed material (206) across several measuring cycles is described by the track T2 which comprises the echoes e0, e2, e5, e8, e11 and e14.

In the course of executing a tracking algorithm, at the point in time t0 the track T2 is initialised, and at the points in time t1, t2, t3, t4 and t5 it is continuously expanded. Correspondingly, at the point in time t1 the track T0 is initialised, and at the points in time t2, t3, t4 and t5 it is continuously expanded. The track list expands again to the point in time t2, at which point the track T1 is initialised. It, too, is continuously expanded at the points in time t3, t4 and t5.

Presentation of the course of echoes, which are caused by a shared reflection position, in the form of a track is described in the literature and is usefully applied also in other fields, for example in air surveillance.

On completion of tracking 103, the found tracks at each of the points in time t0 . . . t5 are provided in the form of a track list.

Figure 5:
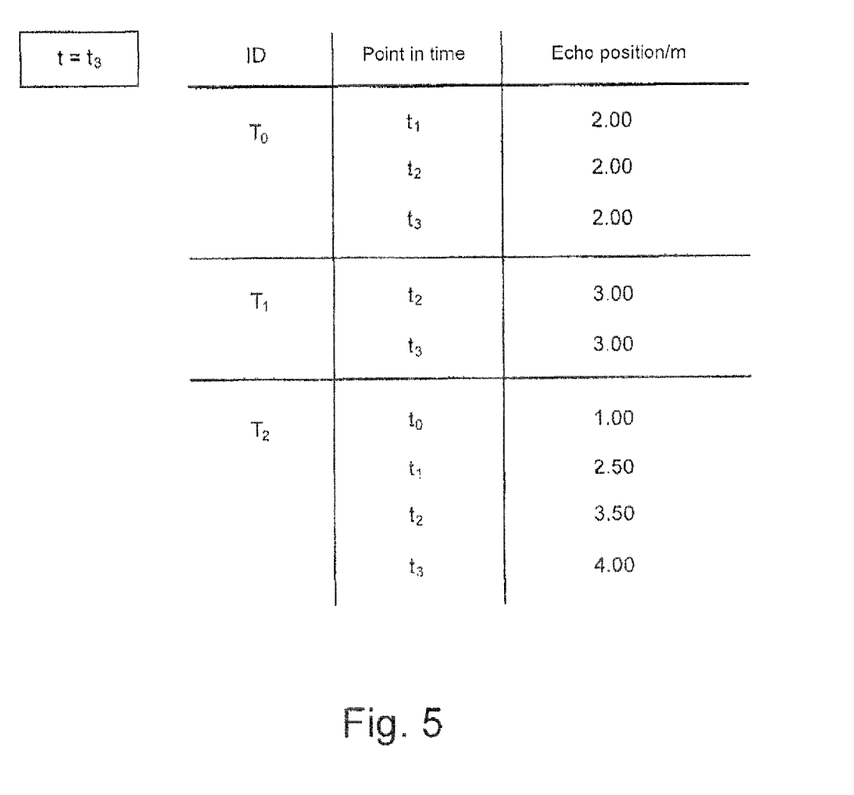
FIG. 5 shows a track list.

FIG. 5 shows, as an example, a track list as it would result from the above sequence of echo curves at the point in time t3. It should again be pointed out that the shown parameters of the track list represent an advantageous selection of possible characteristics of the underlying echoes. Of course, additional or changed characteristics within such a track list can also be tracked.

The track list shown in FIG. 5 represents the result of the tracking algorithm at the point in time t3. Of course, after executing the tracking, at the point in time t4 this list is updated and expands so that, for example, track T2 will comprise a new grid point at 4.50 m.

Based on the track list calculated in the respective measuring cycle, a movement analysis 104 is carried out which provides movement values to the tracks contained in the track list. Continuous addition of the individual movement values between the grid points of the track is an obvious method for acquiring movements of the present tracks. The following calculation rule results for the movement B:

$$B(T_i) = \begin{cases} \sum_{K-1}^{N-1} \left| \begin{array}{l} \text{Position (grid point } k) - \\ \text{Position (grid point } k+1) \end{array} \right| & \text{if } N > 1 \\ 0 & \text{otherwise} \end{cases} \quad (G1)$$

wherein N denotes the number of grid points of the track at the point in time $T_i$.

Figure 6:
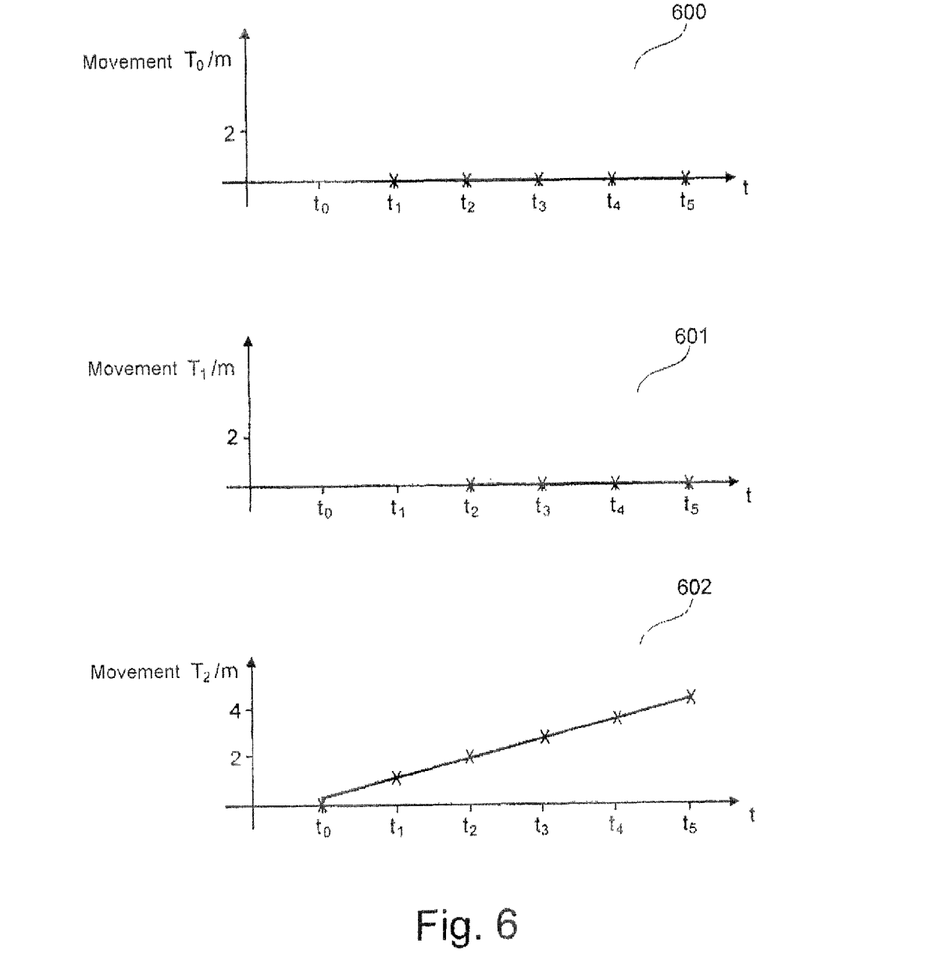
FIG. 6 shows the results of a movement analysis.

FIG. 6 shows the results of the movement values, calculated according to the above diagram, by means of differentiation, relating to the example of FIG. 4. It should be pointed out that determining movements according to the above diagram represents only one variant.

The movement graph 600 for the track T0 shows that the movement analysis at the point in time t0 shows no result whatever. This becomes immediately plausible by making a comparison with the tracking graph 406, since the track T0 is only initialised at the point in time t1. The movement values calculated during further measuring cycles at the points in time t1, t2, t3, t4 and t5 according to the above equation remain constant at 0, which precisely corresponds to the stationarity related to the respective position values of the track T0.

The results of the movement analysis 104 at the points in time t0 . . . t5 relating to track T1 are shown in the movement graph relating to tack T1 601. The illustration shows that the track T1 starts at the point in time t2, and at the points in time t3, t4 and t5 does not show any movement. This in turn agrees with the stationarity of the track T1 in graphic 406.

The tracking graph 406 shows a distinct characteristic in that the track T2 shows a pronounced movement. The movement values determined according to the above equation by movement detection 106 at the points in time t0 to t5 are shown in the movement graph for track T2 602. While during initialisation of the track at the point in time t0 no movement can yet be detected, as a result of the continuous summation of the individual movements from reading to reading the movement dimension relating to the track is continuously increased.

It is the purpose and objective of movement detection to provide additional information relating to the method-related step "Decision regarding fill level" 105. According to DE 42 343 00 A1 the useful echo caused by the feed material is precisely characterised in that among the echoes with movement greater than zero it is precisely that echo which is located closest to the sensor 201. The characteristics 600, 601, 602 calculated by movement detection 104 make it possible, when following this algorithm, to reliably detect the fill level echo 211 from the point in time t1. On completion of the associated measuring cycle, movement detection 104 unequivocally calculates that track T2 has 602 a movement greater than 0.

The decision relating to the fill level can take place with reference to the situation shown without spurious echo storage that is to be carried out in advance. The important role of movement detection to identify the correct fill level echo in a commercial fill-level measuring device is immediately evident and assumes increasing importance with the aim of sensor installation according to the plug-and-play principle, i.e. without special commissioning by the user.

Nevertheless it is desirable to further improve the method presented above. The reasons for this are as follows:

Due to continuously changing reflection conditions as a result of different feed materials and/or layers of the measured product, external influences such as interference by electromagnetic waves, build-up of impurities on the antenna and further influences, the stability of the received echo curves relative to their amplitude gradient cannot be achieved. In practical applications this leads to a problem in that echoes of identical reflection positions 204, 205, 206 are subject to at times massive fluctuations both in relation to their shape and to their amplitude from measuring cycle to measuring cycle. The average person skilled in the art immediately realises that the functionality of tracking 103 can also be impeded as a result of the unstable echo data. Therefore in practical applications time and again incorrect allocation of actual echoes to the existing tracks occurs.

Figure 7:
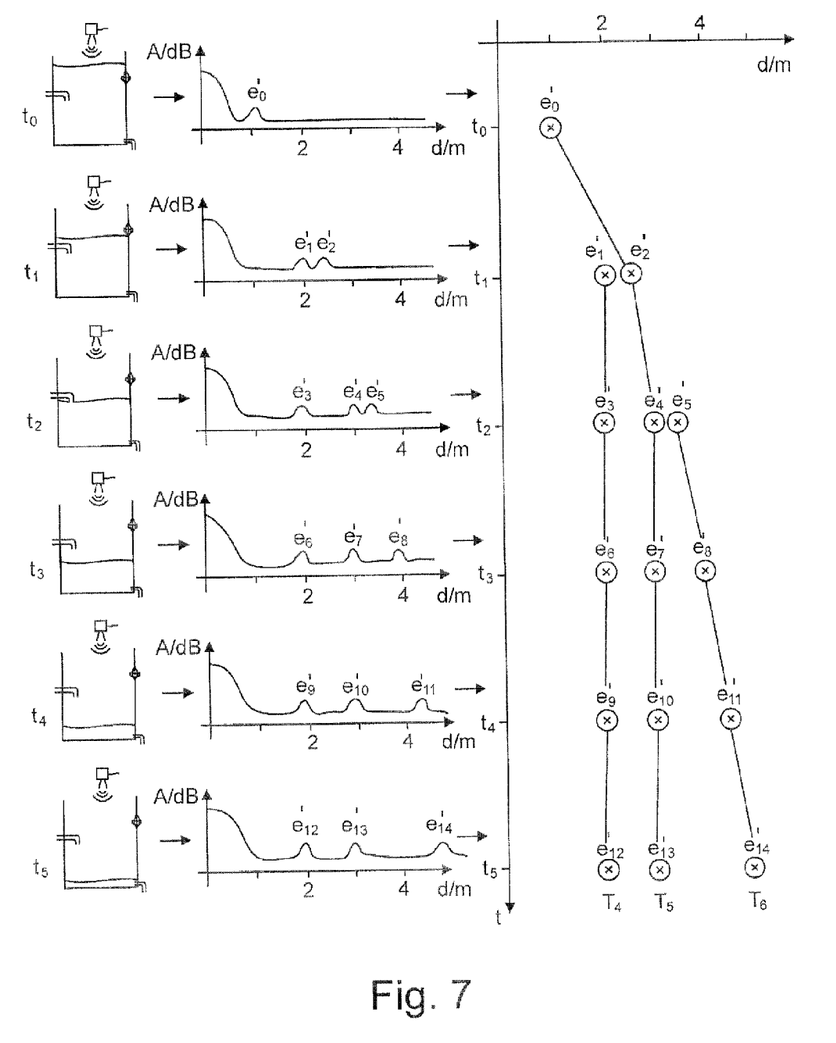
FIG. 7 shows the repetition of measuring cycles with incorrect tracking.

FIG. 7 depicts the conditions as they can develop based on a single incorrect allocation.

The scenario shown of a discharge of the container 207 basically corresponds to the scenario shown in FIG. 4, wherein the exact characteristics of the echoes $e'_0$ have, however, slightly changed as a result of extraneous influences. Due to this change, at the point in time t2 there is another allocation of echoes to tracks. Echo $e'_4$ is now allocated to track T5, which results in echo $e'_5$ initialising a new track T6.

Figure 8:
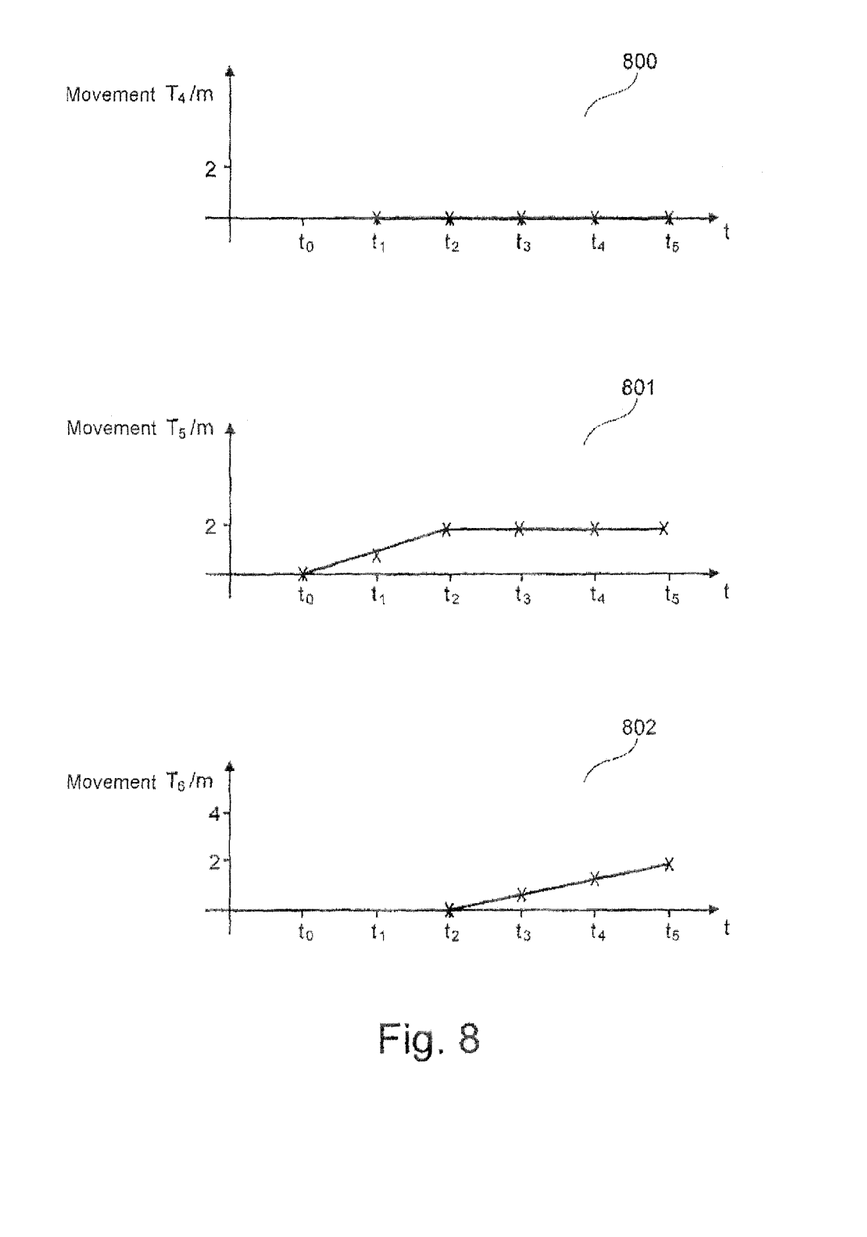
FIG. 8 shows the results of the movement analysis with incorrect tracking.

FIG. 8 shows the results of the movement analysis according to the method shown above, which method corresponds to the state of the art. It becomes immediately evident that track T5 keeps constant its movement values, which it has added up to the measuring cycles at the points in time t0, t1 and t2. Consequently, it is confirmed that track T5 has a pronounced movement also during the points in time t3, t4 and t5. If for the purpose of identification of the useful echo caused by the feed material a method according to DE 42 343 00 is used, then from point in time t2 onwards incorrectly the echoes $e'_4$, $e'_7$, $e'_{10}$, as well as $e'_{13}$, are issued as useful echoes, because they belong to a track (T5) that shows pronounced movement and is closest to the sensor.

At this stage it should be mentioned that the problem associated with hitherto-known movement detection methods occurs even if by means of Kalman filters or other methods a singular examination of the movement of a single track is carried out.

To solve this problem an attempt can be made to calculate the movement analysis according to the above scheme only over M previous grid points of each track, for example M=5.

Furthermore, it may also be possible, by means of a smoothing function, to erode the determined movement values towards the movement value of 0 if no recent movement values achieve refreshment of the hitherto-achieved movement value.

However, both these approaches can lead to unsatisfactory results in the context of fill level measuring. In a typical case, for example, a plant is filled and emptied from Monday to Friday within a production plant so that over time an understanding of the movement relating to the individual tracks is collected within the sensor. If then over the weekend no work takes place within the plant, as a result of new movement values the hitherto-collected information about the movement of the individual tracks is gradually lost, despite there not being any change in the echo conditions within the plant.

It may be an object of the present invention to provide a robust method for detecting changes over time in the characteristics of one or several echoes within a fill-level measuring device. For example, the detection of changes relates to the position of the examined echoes or tracks, but it may also be possible to apply the method to other characteristics.

Figure 9:
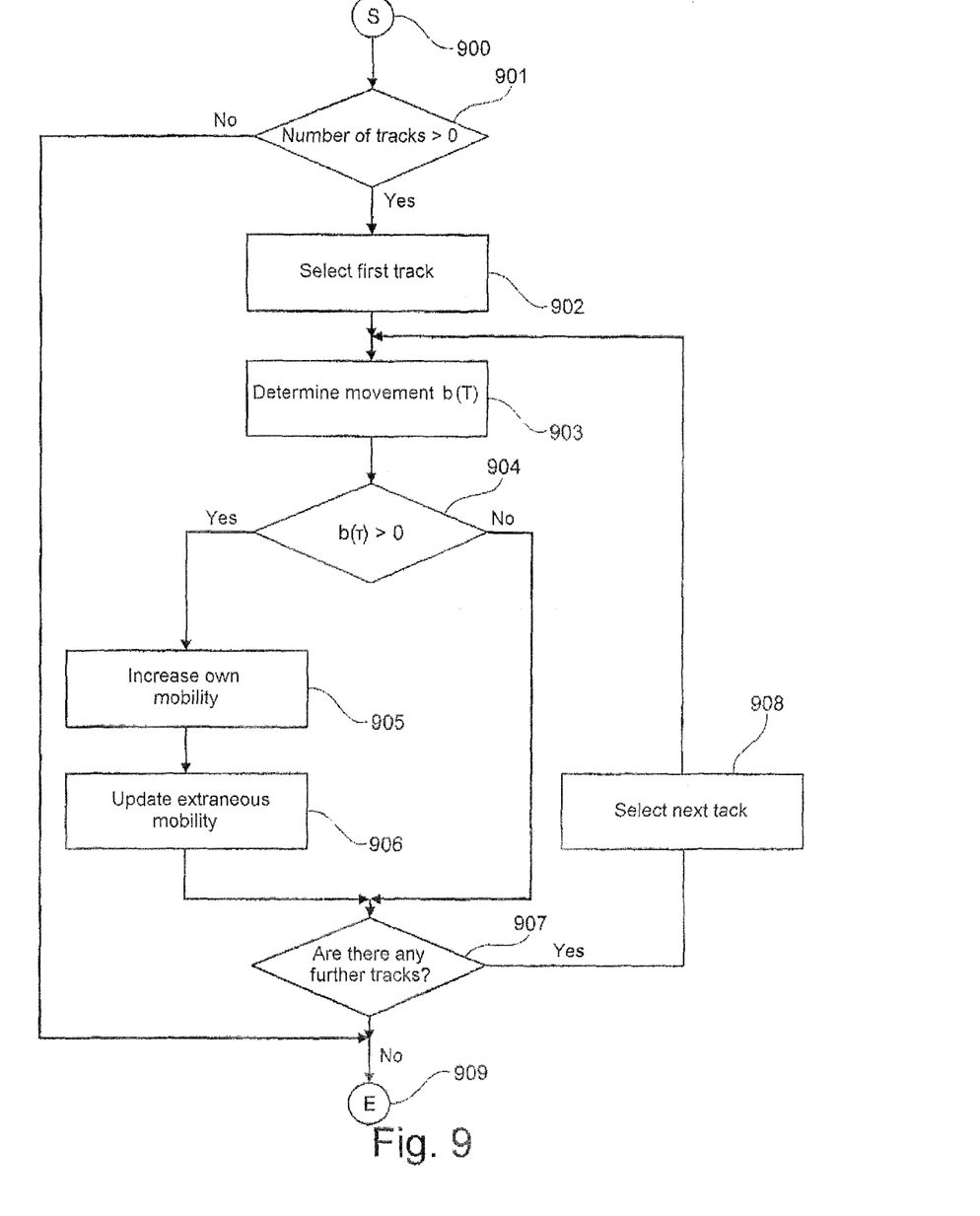
FIG. 9 shows a process diagram for detecting the mobility according to an exemplary embodiment of the invention.

FIG. 9 shows the basic sequence of the method 104, which is called up in the course of each measuring cycle, for example subsequent to the tracking function 103. The method commences in the start state 900. In the method-related step 901 a check is made whether the track list contains any tracks at all. If the track list is empty, the method directly ends in the end state 909. In contrast to this, if the track list contains at least one track, in step 902 this track is determined (selected) to be the track examined at that time. In step 903 the movement value $b(T_i)$ which has been added since the last analysis is being determined (presently: $b(T_1)$, because it is the first track, for example according to the following equation:

$$b(Ti) = \begin{cases} |\text{Position}(e_N) - \text{Position}(e_{N-1})| & \text{if } N > 1 \\ 0 & \text{otherwise} \end{cases} \quad (G2)$$

wherein $e_N$ denotes the currently added grid point of the track and $e_{N-1}$ denotes the grid point marked N, which has been added to the track during the last measuring cycle. N denotes the consecutive number of the reading, while i denotes the consecutive number of the track.

If the newly added movement value $b(T_i)$ is greater than zero, then in the method-related step 905 the intrinsic mobility value of the then selected track is increased by the determined movement $b(T_i)$. Preferably, the mobility value of a track which across several measuring cycles needs to be updated time and again is administered as an additional column in a track list according to the diagram of FIG. 5, wherein at the point of initialisation of a track a mobility value of 0 is postulated.

In the method-related step 906 as a core aspect of the present invention the then determined movement value $b(T_i)$ is used to update the mobility values of the other tracks that are administered at the same time.

Figure 11:
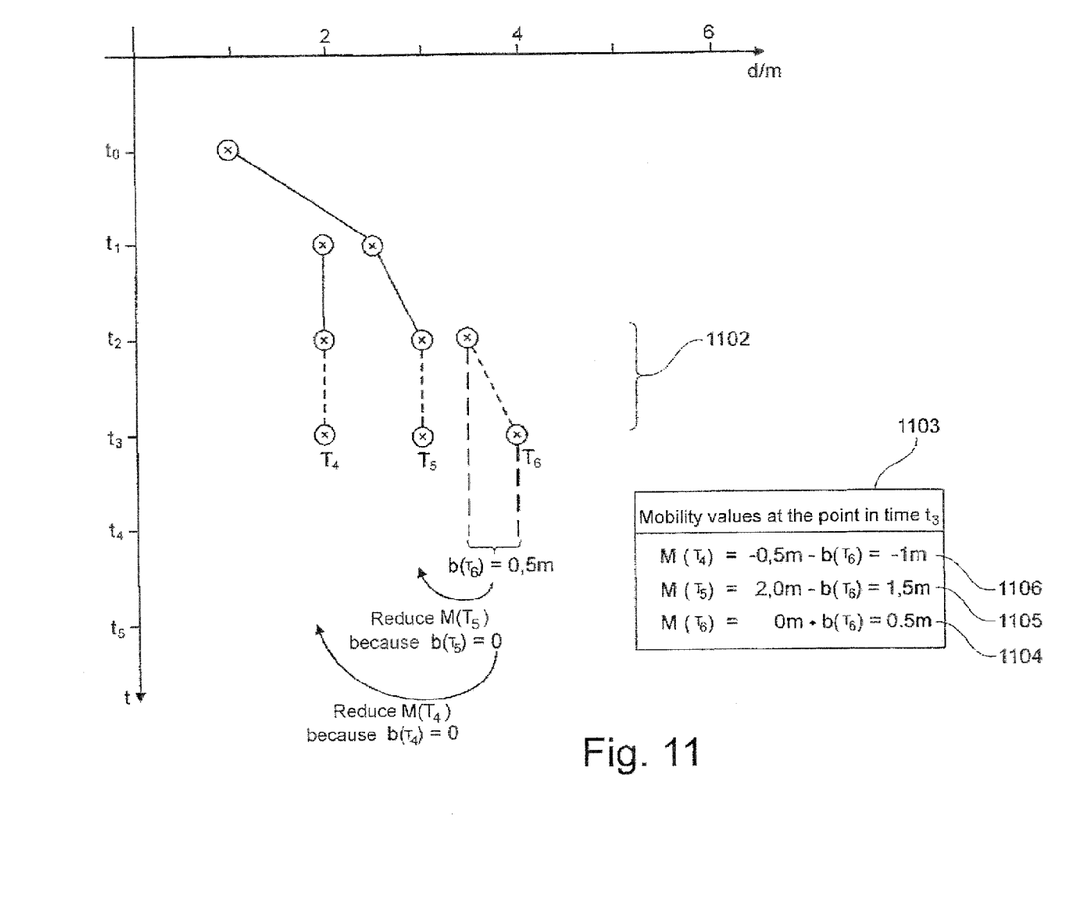
FIG. 11 shows method-related steps for detecting the mobility according to an exemplary embodiment of the invention.

FIG. 11 illustrates the basic idea of the method. Starting from the mobility values at the point in time t2 of the last reading (M(T4)=−0.5 m; M(T5)=2.0 m; M(T6)=0 m) a renewed pass of movement detection starts at the point in time t3 of the actual reading.

The mobility value M(T4) at the point in time t2 (which value is −0.5 m) results from the hitherto applicable mobility value of T4 at the point in time t1 (which is zero, because T4 appears for the first time at this point in time) minus b(T5) at the point in time t2.

The period of time since the movement analysis has most recently been carried out at the point in time t2 provides the movement period 1102 presently to be investigated. It becomes evident that the racks T4 and T5 do not show any movement in the period of time 1102 under examination, in other words b(T4)=0 and b(T5)=0. In contrast, in the period of time 1102 under investigation the track T6 shows movement b(T6)=0.5 m. According to the method-related step 905 (see FIG. 9) first an increase in the intrinsic mobility of the track T6 1104 by the determined movement value takes place.

In the method-related step 906 the mobility of extraneous tracks is then updated. The special situation in the context of fill level measuring provides the algorithmic grounds for this method-related step. Generally speaking, a differentiation between two states can be made. In the stationary state neither filling nor emptying of a fill level container takes place. Consequently all the existing echoes/tracks need to have a stationarity related to their location. In the dynamic state there is a change in the fill level as a result of filling and/or emptying. Consequently, all the echoes which in whatever way depend on the fill level echo (fill level echo, multiple echoes, ground echo) in the same period of time need to have a dynamic behaviour related to the location. In other words, it can be said that all the echoes that are not spurious echoes need to move at the same time. If an echo within a period of time in the dynamic state does not move, then it is to be considered a spurious echo.

Since track 4 in the presently examined period of time of movement 1102 has no mobility, while at the same time, however, track T6 shows a clear simultaneous movement (dynamic state), the assertion that track 4 is stationary is consolidated 1106 by subtraction of the movement value of track T6. In the same manner the mobility value of track T5 is reduced 1105 by subtraction of the movement value of track T6. Up to this point, track T5 has shown clear mobility which is, however, now put in question by the method, because track T5 no longer moves simultaneously with track T6. In the further course of the method, in this manner the mobility of track T5 is more and more reduced until finally stationarity of T5 is indicated.

Figure 10:
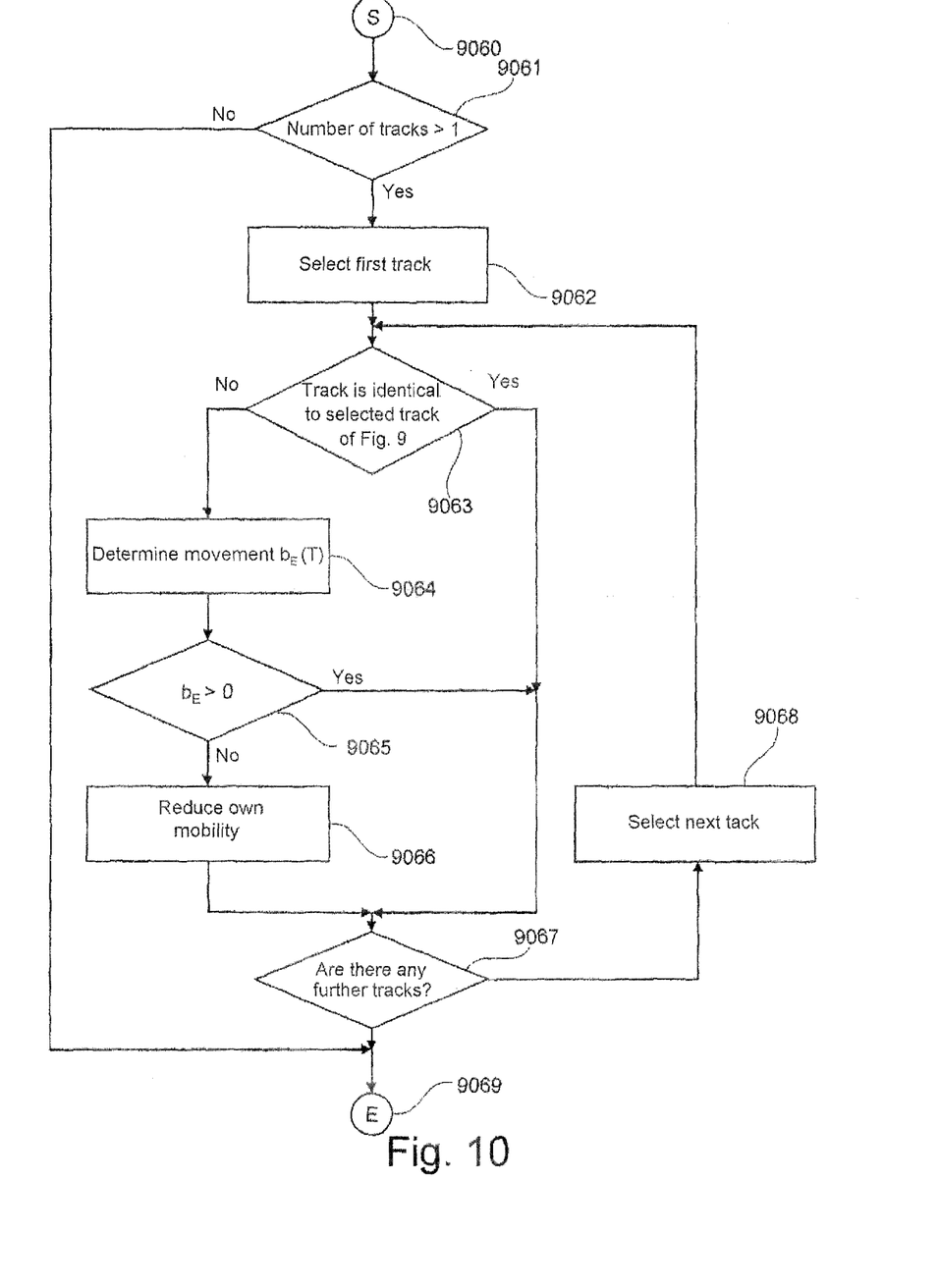
FIG. 10 shows a process diagram for updating extraneous mobility according to an exemplary embodiment of the invention.

FIG. 10 shows the exact sequence of updating extraneous tracks. The method-related step starts in state 9060. First a check is made as to whether, apart from the currently examined track from FIG. 9, there are further tracks contained in the track list. If this is the case, then in relation to all the tracks of the track list, which tracks do not correspond to the currently examined track of FIG. 9, the current own movement $b_E$ is determined 9064 in accordance with the procedure shown in equation (G2). If this own movement equals zero, in method-related step 9066 a reduction in the own mobility takes place by the currently determined movement value from method-related step 903. Step 9066 can be understood with reference to FIG. 11 in 1106 and 1105. In a corresponding manner according to the process diagram of FIG. 11 all the extraneous mobility values 1105, 1106 are updated. In contrast to hitherto-known methods for movement detection the present method does not provide any movement values, but instead provides mobility values.

According to the invention, the term "movement" refers to information, determined by means of singular examination of a single track, relating to the change in a physical quantity (e.g. location). According to the present invention, the term "mobility" is associated with simultaneous examination of a multitude of echoes and/or tracks, which examination aims to observe changes in a physical quantity (e.g. location) in the context of the manner in which corresponding quantities behave in other echoes/tracks.

Figure 12:
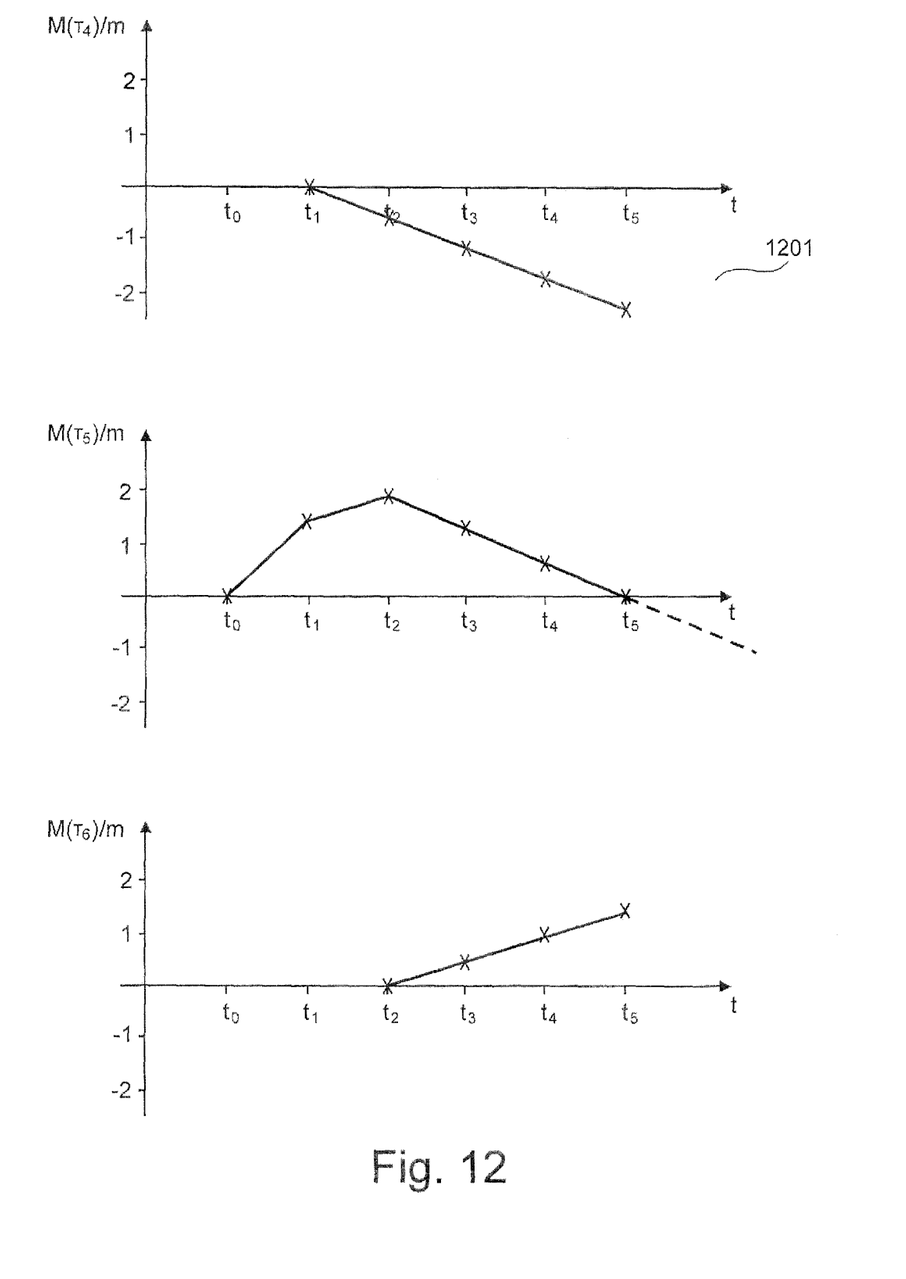
FIG. 12 shows the results of detecting the mobility according to an exemplary embodiment of the invention.

FIG. 12 shows the mobility values as they result in the points in time t0 ... t5 by application of the method according to the invention. The diagram clearly shows that the mobility of track 5, caused by the movement of track T6, is completely revised in the period of time between t2 and t5. It is further pointed out that in the case of stationary behaviour of all the echoes/tracks there is of course no reduction in the mobility values once they have been determined.

With reference to FIG. 12 it becomes immediately evident that according to the present method negative mobility values can arise 1201. This characteristic, which is due to the nature of the method, can be used to interpret the term "mobility" anew.

Figure 13:
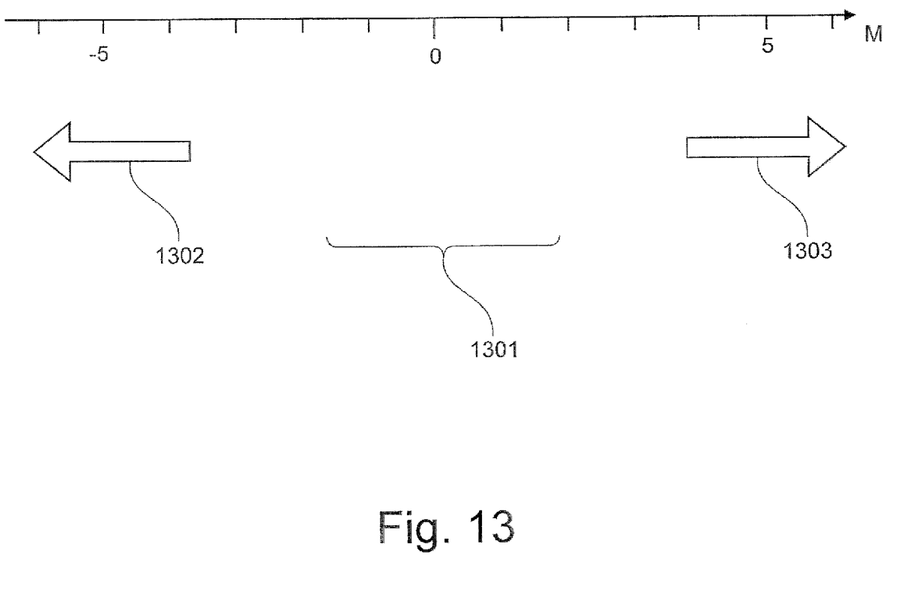
FIG. 13 shows the interpretation of the mobility value according to an exemplary embodiment of the invention.

FIG. 13 shows a corresponding interpretation variant, wherein the scale values shown as examples can be selected at will. If the mobility value is in the region of 0, see reference character 1301 (for example after initialisation of a new track), then no solid information relating to the movement of this echo/track can be provided. Both an assertion according to which the echo/the track moves, and the assertion the echo/the track is stationary, completely lack any basis. If the mobility value is in the negative range 1302, with increasing certainty pronounced stationarity of the corresponding track can be assumed. Correspondingly, in the case of positive mobility 1303 pronounced dynamics of the track can be assumed.

If the block "Decision relating to fill level" 105 is not in a position to correctly interpret mobility values of movement detection 104, then in an obvious manner the mobility detection can be modified to such an extent that the mobility M is transferred to a movement B. For example a transformation according to the following scheme may be possible:

$$B(T_i) = \begin{cases} M(T_i) & \text{if } M > 0 \\ 0 & \text{otherwise} \end{cases} \quad (G3)$$

However, it should be pointed out that in this case the findings relating to assured stationarity cannot be further used.

The method described above makes possible robust detection of mobility values of echoes/tracks within a fill-level measuring device, and apart from the tolerance in the case of incorrect allocations of tracks in particular also provides advantages during the periods of time in which a plant is not actively operating, for example over the weekend.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A device for determining a fill level and mobility of an echo, comprising:
   a processor determining a first position shift of a first echo of an echo curve during a defined time interval, the processor determining a second position shift of a second echo of the echo curve during the defined time interval,
   wherein the processor calculates a mobility value of the second echo of the echo curve by using the first position shift,
   wherein the mobility value of the second echo is a characteristic relating to the second position shift of the second echo and to the first position shift of the first echo,
   wherein, when the second position shift of the second echo is zero, the first position shift used for the calculation of the mobility value of the second echo of the echo curve always results in a decrease of the mobility value of the second echo of the echo curve, and
   wherein the mobility value is used to determine whether a track of the second echo is one of stationary and dynamic.

2. The device according to claim 1, wherein the echo curve is measured at a first point in time and wherein, in the calculation of the mobility value of the second echo of the echo curve, only the first position shift of the first echo is used if the second position shift is zero.

3. The device according to claim 1, wherein the echo curve is measured at a first point in time and wherein, in the calculation of the mobility value of the second echo of the echo curve, only the first position shift of the first echo is used if the second position shift indicates that the second echo has not shifted since an echo curve measured prior to the first point in time.

4. The device according to claim 1, wherein the mobility value of the second echo of the echo curve is calculated in that the first position shift is subtracted from a hitherto applicable mobility value of the second echo.

5. The device according to claim 1, wherein the processor is designed for calculating a mobility value of the first echo of the echo curve by using the second position shift.

6. The device according to claim 1, wherein the processor calculates a mobility value of a third echo of the echo curve by using the first position shift, the second position shift and a third position shift of the third echo.

7. The device according to claim 1, wherein the device is a fill level radar.

8. A method for determining a fill level and mobility of an echo, comprising the steps of:
   determining, by a processor, a first position shift of a first echo of an echo curve during a defined time interval;
   determining, by the processor, a second position shift of a second echo of the echo curve during the defined time interval; and
   calculating, by the processor, a mobility value of the second echo of the echo curve by using the first position shift,
   wherein the mobility value of the second echo is a characteristic relating to the second position shift of the second echo and to the first position shift of the first echo,
   wherein, when the second position shift of the second echo is zero, the first position shift used for the calculation of the mobility value of the second echo of the echo curve always results in a decrease of the mobility value of the second echo of the echo curve, and
   wherein the mobility value is used to determine whether a track of the second echo is one of stationary and dynamic.

9. The method according to claim 8, wherein the mobility value of the second echo of the echo curve is calculated in that the first position shift is subtracted from a mobility characteristic of the second echo.

10. A non-transitory computer-readable medium on which a program element is stored which when executed on a processor of a device instructs the processor to carry out the following steps:
    determining a first position shift of a first echo of an echo curve during a defined time interval;
    determining a second position shift of a second echo of the echo curve during the defined time interval; and
    calculating a mobility value of the second echo of the echo curve with the use of the first position shift,
    wherein the mobility value of the second echo is a characteristic relating to the second position shift of the second echo and to the first position shift of the first echo,
    wherein, when the second position shift of the second echo is zero, the first position shift used for the calculation of the mobility value of the second echo of the echo curve always results in a decrease of the mobility value of the second echo of the echo curve, and
    wherein the mobility value is used to determine whether a track of the second echo is one of stationary and dynamic.

11. The device of claim 1, further comprising:
    an antenna transmitting signals and receiving reflected signals.

* * * * *